United States Patent [19]
Lin

[11] Patent Number: 5,462,502
[45] Date of Patent: Oct. 31, 1995

[54] BRAKE MECHANISM FOR AN AUTOMOBILE

[76] Inventor: Chien-Hung Lin, No.113, Chung-Shan Rd., Fan-Chang Tsun, Chang-Chih Hsiang, Ping-Tung Hsien, Taiwan

[21] Appl. No.: 264,627

[22] Filed: Jun. 23, 1994

[51] Int. Cl.[6] ................................................. B60K 41/20
[52] U.S. Cl. ............................................ 477/197; 477/186
[58] Field of Search .................................. 477/197, 186, 477/184

[56] References Cited

U.S. PATENT DOCUMENTS

| | | | |
|---|---|---|---|
| 1,843,966 | 2/1932 | Adams | 477/197 |
| 1,843,986 | 2/1932 | Adams | 477/197 |
| 2,245,958 | 6/1941 | Barr et al. | 477/197 |
| 4,949,820 | 8/1990 | Fontaine et al. | 477/197 |

Primary Examiner—Dirk Wright
Attorney, Agent, or Firm—Dominik & Stein

[57] ABSTRACT

A brake mechanism is retainable releasably in a braking state and includes a fixed base member to which a brake pedal unit is connected pivotally. An electromagnet is mounted on the brake pedal unit. A motor unit is located on one side of the electromagnet and has a driving shaft with a first end portion extending away from the electromagnet and a second end portion extending toward the electromagnet. A sheave is mounted securely on the first end portion of the driving shaft. A string unit has a first end portion connected to the sheave and a second end portion to be secured to a body part of the automobile. A permanent magnet is sleeved on and is movable along the second end portion of the driving shaft. The motor unit and the electromagnet are normally deactivated so as to permit the electromagnet to attract normally with the permanent magnet in order to prevent rotation of the driving shaft to prevent correspondingly winding of the string unit on the sheave. The electromagnet and the motor unit are activable so as to permit winding of the string unit on the sheave to retain the brake mechanism in the braking state. The electromagnet and the motor unit can also be activated so as to permit unwinding of the string unit to release the brake mechanism from the braking state.

3 Claims, 6 Drawing Sheets

BRAKE MECHANISM FOR AN AUTOMOBILE

BACKGROUND OF THE INVENTION

1. Field of the Invention

This invention relates to a brake mechanism for an automobile, more particularly to a brake mechanism which can be retained releasably in a braking state.

2. Description of the Related Art

The applicant of the present invention has four copending U.S. patent applications, namely application Ser. Nos. 08/126,182, now allowed, 08/169,178, still pending, 08/194,421, still pending, and 08/219,442, now allowed, which disclose a brake mechanism that can be retained releasably in a braking state so as to prevent the driver of an automobile from suffering from fatigue of his calf due to constant pressing of a brake pedal plate. However, the applicant found that the brake mechanisms of the aforementioned co-pending applications are power-consuming and the circuits employed therein are somewhat complicated.

SUMMARY OF THE INVENTION

Therefore, the main objective of the present invention is to provide a brake mechanism for an automobile, which brake mechanism is retainable releasably in a braking state, consumes a relatively small amount of electrical power, and employs a less complicated circuit.

Accordingly, the brake mechanism of the present invention is to be used in an automobile and can be retained releasably in a braking state. The brake mechanism includes a fixed base member, a brake pedal unit, a torsional spring, a retaining assembly, an electrical control means, a detector, a first switching means and a second switching means. The fixed base member is disposed securely in the automobile and has a front end and a rear end which is to be disposed adjacent to a body part of the automobile. The base member is formed with a positioning plate between the front and rear ends, and a pivot pin posterior to the positioning plate. The brake pedal unit has an upper end which is connected pivotally to the pivot pin. The torsional spring is provided on the pivot pin and biases the brake pedal unit to abut normally against the positioning plate. The retaining assembly is to be provided on one of the body part of the automobile and the brake pedal unit. The retaining assembly includes: an electromagnet; a motor unit which is located on one side of the electromagnet and which has a driving shaft with a first end portion extending away from the electromagnet and a second end portion extending toward the electromagnet; a sheave which is mounted securely on the first end portion of the driving shaft; a string unit which has a first end portion that is connected to the sheave and a second end portion that is to be secured to the other one of the body part of the automobile and the brake pedal unit; and a permanent magnet which is sleeved on the second end portion of the driving shaft between the motor and the electromagnet and which is movable along the second end portion. The electrical control means is connected electrically to the electromagnet and the motor unit. The electrical control means normally deactivates the motor unit and the electromagnet to permit the electromagnet to attract normally with the permanent magnet so as to prevent rotation of the driving shaft to prevent correspondingly winding of the string unit on the sheave. The detector is connected electrically to the control means and is operatively associated with a speedometer for detecting speed of the automobile. The first switching means is connected electrically to the control means and is operatively associated with the brake pedal unit. The first switching means is activated when the brake pedal unit pivots away from the positioning plate due to application of pressure on the brake pedal unit. The control means is enabled in order to activate the electromagnet so as to repel the permanent magnet and in order to activate the motor unit to rotate the driving shaft in a first direction so as to wind the string unit on the sheave when the first switching means is activated and the detector has detected that the speed of the automobile is zero for a predetermined time interval, thereby placing the brake mechanism in the braking state. The second switching means is connected electrically to the control means and is activable so as to release the brake mechanism from the braking state. The second switching means enables the control means in order to activate the electromagnet so as to repel the permanent magnet and in order to activate the motor unit to rotate the driving shaft in a second direction opposite to the first direction so as to unwind the string unit when the second switching means is activated.

BRIEF DESCRIPTION OF THE DRAWINGS

Other features and advantages of the present invention will become apparent in the following detailed description of the preferred embodiments, with reference to the accompanying drawings, of which.

DETAILED DESCRIPTION OF THE PREFERRED EMBODIMENTS

Figure 1:
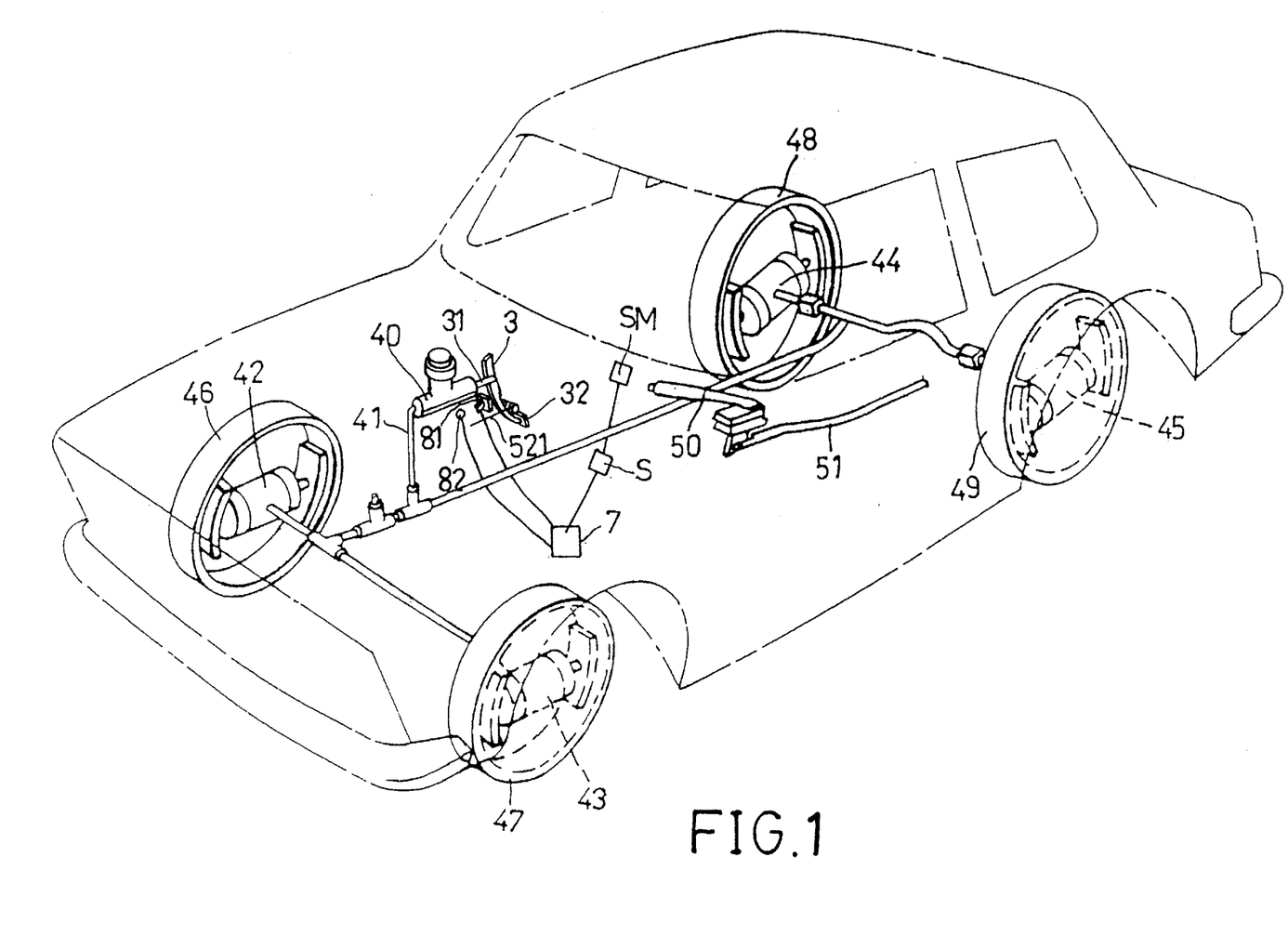
FIG. 1 is a schematic view showing a brake mechanism which is installed in an automobile according to a first embodiment of the present invention.
Figure 2:
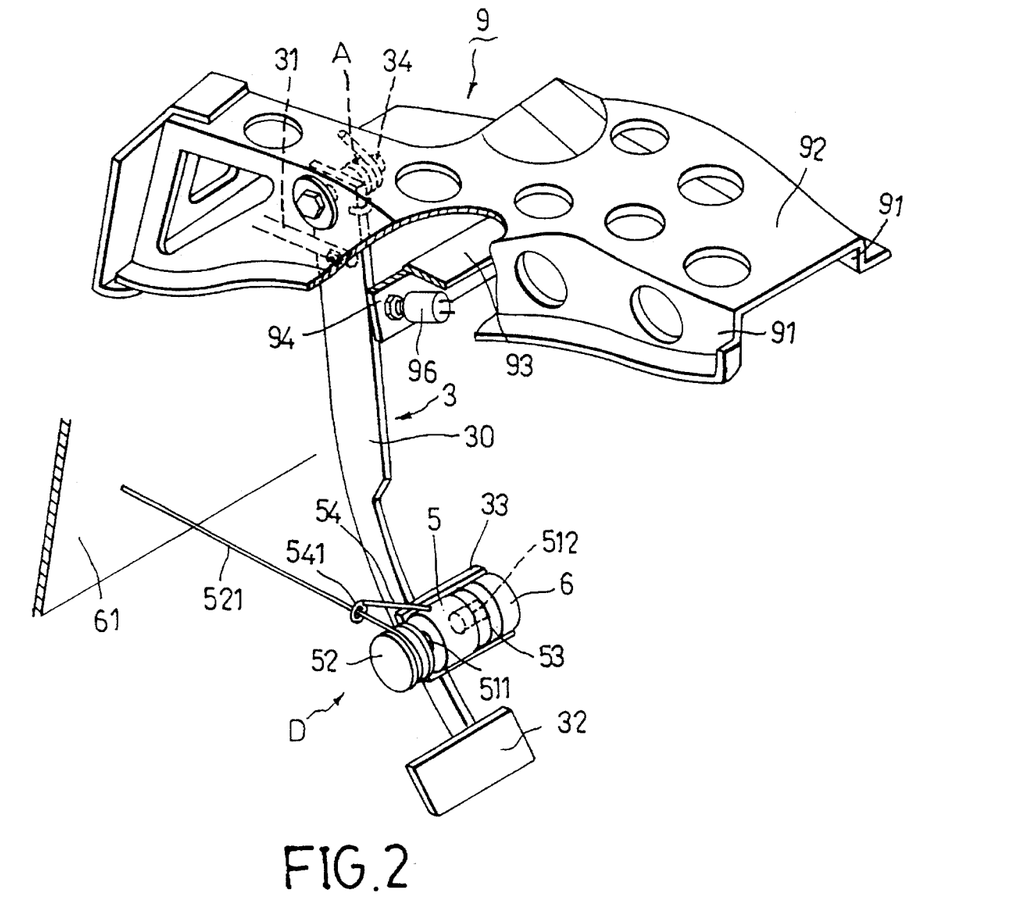
FIG. 2 is a partly enlarged view of the brake mechanism according to the first embodiment of the present invention.
Figure 3:
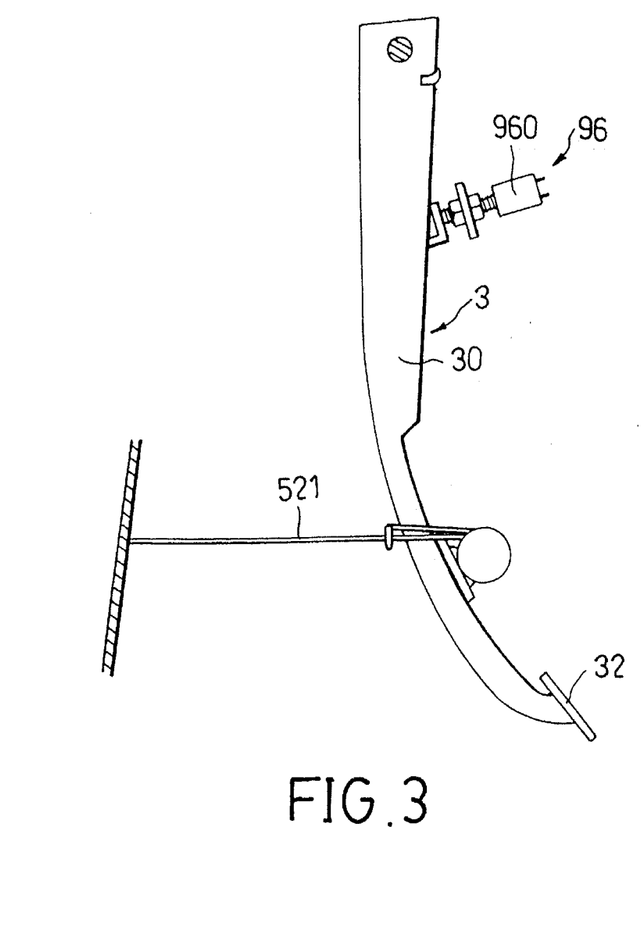
FIG. 3 is an enlarged view showing a brake pedal unit of the brake mechanism according to the first embodiment of the present invention.

Referring to FIGS. 1 and 2, a brake mechanism according to the first embodiment of the present invention includes a fixed base member 9, a brake pedal unit 3, a torsional spring (A), a retaining assembly (D), an electrical control means 7, a first switching means 96, a second switching means 82, and a detector (S). The automobile (shown in phantom lines), which incorporates the brake mechanism, has a hydraulic brake system that includes a hydraulic brake cylinder 40 which is activated by the brake pedal unit 3, a wheel cylinder assembly, and a hydraulic oil pipe unit 41 which interconnects the brake cylinder 40 and the wheel cylinder assembly so that hydraulic oil can flow from the brake cylinder 40 to the wheel cylinder assembly via the oil pipe unit 41 when the brake pedal unit 3 is pressed and so that hydraulic oil can return to the brake cylinder 40 from the wheel cylinder assembly via the oil pipe unit 41 when the brake pedal unit 3 is released. The automobile has a wheel assembly which includes two front wheels and two rear wheels, and a brake assembly which includes four brake units 46,47,48,49 that are mounted operatively and respectively on the wheels of the wheel assembly and that are activated respectively by the wheel cylinders 42,43,44,45 of the wheel cylinder assembly. Inherently, the hand brake lever 50 of the hand brake mechanism of the automobile is operated to activate the brake units 48, 49 of the rear wheels directly by means of a mechanical driving assembly 51 which interconnects the hand brake lever 50 and the brake units 48,49 of the rear wheels.

The fixed base member 9 is a pressed metal sheet and is generally inverted U-shaped in cross-section. The base member 9 has a top wall 92 with two longitudinal edges and two side walls 91 which extend downwardly from the edges of the top wall 92. The base member 9 is disposed securely in the automobile and has a front end and a rear end. A coupling rod 93 interconnects the two side walls 91 and is located adjacent to the front end of the base member 9. A positioning plate 94 extends from the coupling rod 93 between the front and rear ends of the base member 9. A pivot pin 34 extends between the two side walls 91 and is posterior to the positioning plate 94.

The preceding description of the present invention is similar to that disclosed in co-pending U.S. Patent applications Nos. 08/126,182, 08/169,178, 08/194,421 and 08/219,442 by the applicant. The features of the present invention, which differ from those of the co-pending applications, are detailed as follows.

The rear end of the fixed base member 9 is to be disposed adjacent to a body part 61 of the automobile.

The brake pedal unit 3 has a pivot shaft 30, a pedal plate 32 and a driving rod 31 which interconnects the hydraulic brake cylinder 40 and the pivot shaft 30. The pivot shaft 30 has an upper end that is connected pivotally to the pivot pin 34 and a lower end to which the pedal plate 32 is connected securely so that the hydraulic brake cylinder 40 is activated when the pedal plate 32 is pressed. A seat member 33 is located on the pivot shaft 30 above the pedal plate 32.

The torsional spring (A) is sleeved on the pivot pin 34 and has a first arm that abuts against the bottom wall surface of the top wall 92 of the base member 9 and a second arm that abuts against the pivot shaft 30 so as to bias the pivot shaft 30 to abut normally against the positioning plate 94 during normal conditions.

The retaining assembly (D) includes an electromagnet 6, a motor unit 5, a sheave 52, a string unit 521 and a permanent magnet 53. The electromagnet 6 is mounted securely on the seat member 33. The motor unit 5 is installed on the seat member 33 and is located on one side of the electromagnet 6. The motor unit 5 has a driving shaft with a first end portion 511 extending away from the electromagnet 6 and a second end portion 512 extending toward the electromagnet 6. A guiding member 54 projects from the motor unit 5 and has a distal end formed with a guide hole 541. The sheave 52 is mounted securely on the first end portion of the driving shaft so as to rotate synchronously with the latter. The string unit 521 has a first end portion connected to the sheave 52 and a second end portion which extends through the guide hole 541 and which is secured to the body part 61 of the automobile. The permanent magnet 53 is sleeved on the second end portion 512 of the driving shaft between the motor unit 5 and the electromagnet 6 and is movable along the second end portion 512. It should be noted that the cross-section of the second end portion 512 of the driving shaft is generally square such that rotation of the driving shaft can cause corresponding rotation of the permanent magnet 53.

Referring to FIGS. 1, 2, 4 and 5, the first and second switching means 96,82 employed in the present embodiment are microswitches. The first switching means 96 has two normally-closed contacts 962, while the second switching means 82 has one normally-open contact 821. The second switching means 82 is operatively associated with the gas pedal 81 of the automobile.

Figure 4:
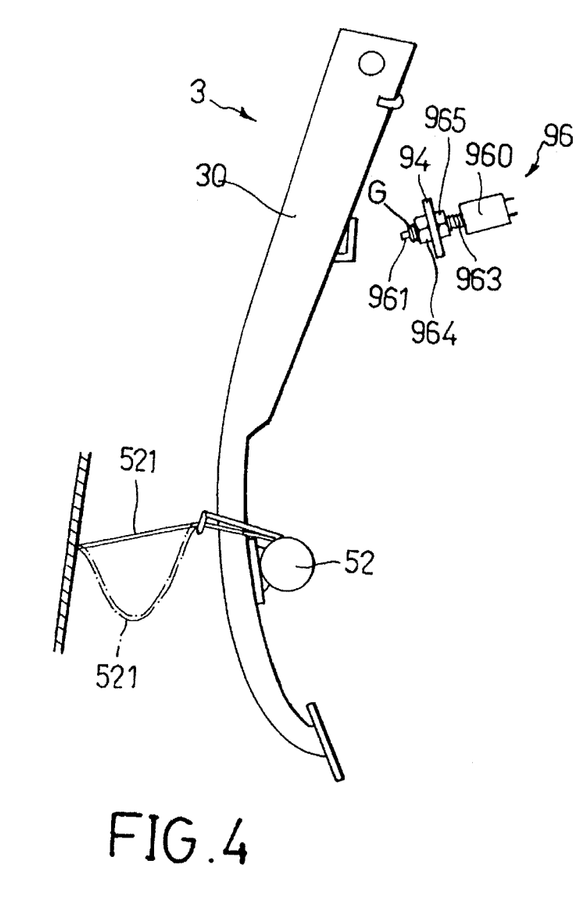
FIG. 4 is an enlarged view similar to that of FIG. 3 illustrating the brake pedal unit when pressed.
Figure 5:
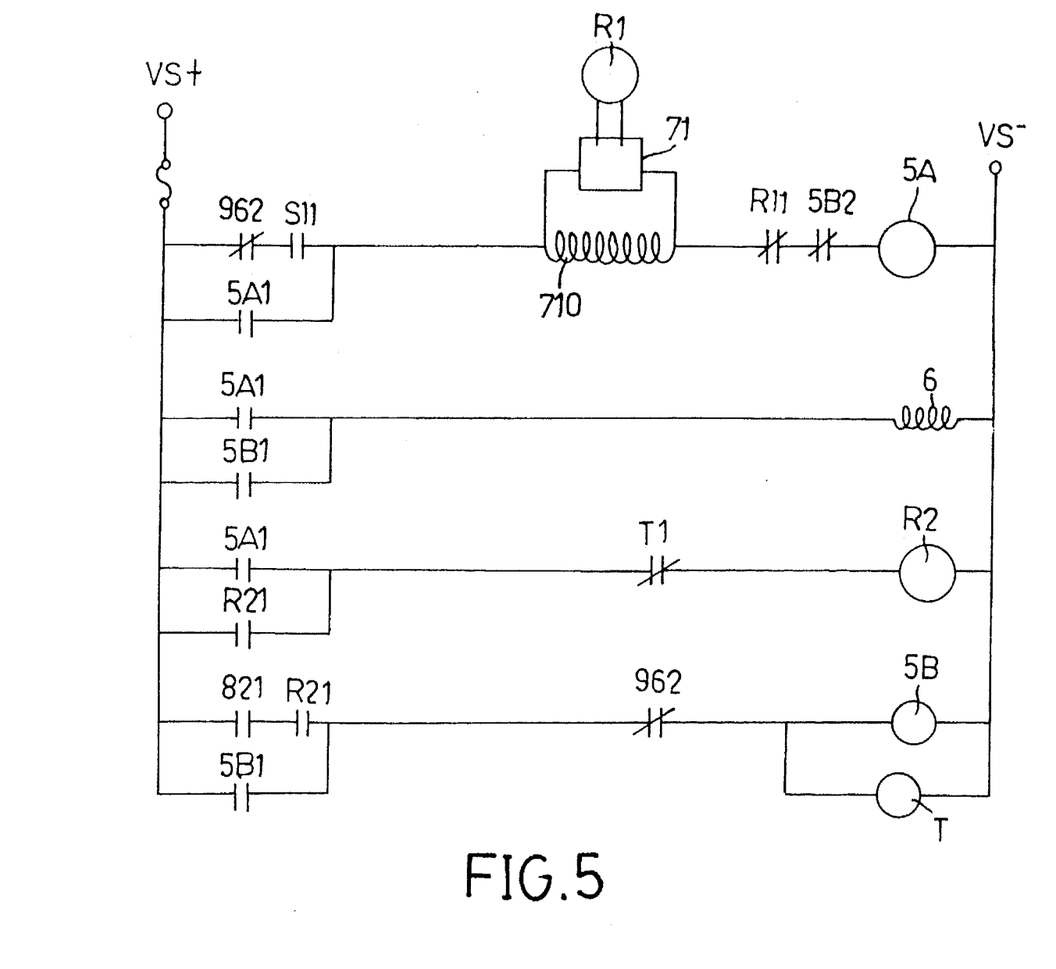
FIG. 5 is a schematic circuit view of the circuit employed in the first embodiment.
Figure 6:
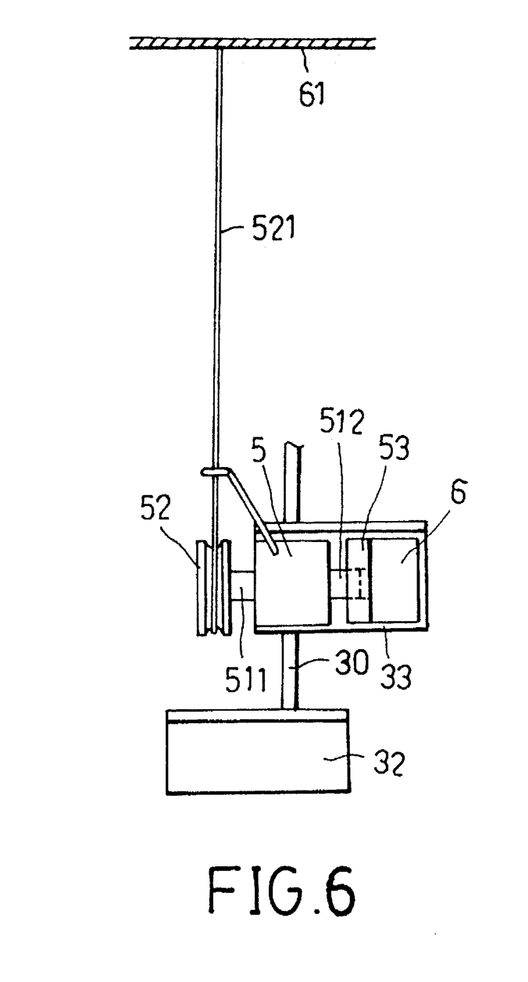
FIG. 6 is a schematic view of the brake mechanism according to the first embodiment of the present invention illustrating the brake pedal unit in an unpressed state and the electromagnet in a deactivated state.
Figure 7:
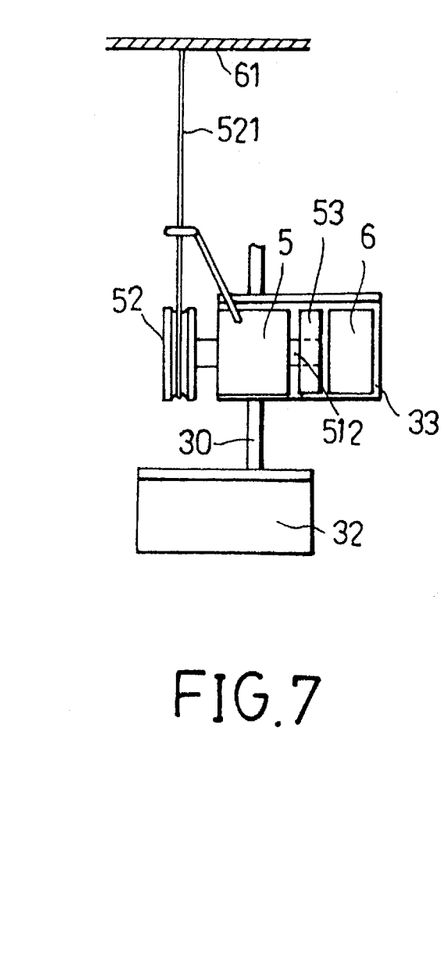
FIG. 7 is a schematic view similar to that of FIG. 6 illustrating the brake pedal unit in a pressed state and the electromagnet in an activated state.
Figure 8:
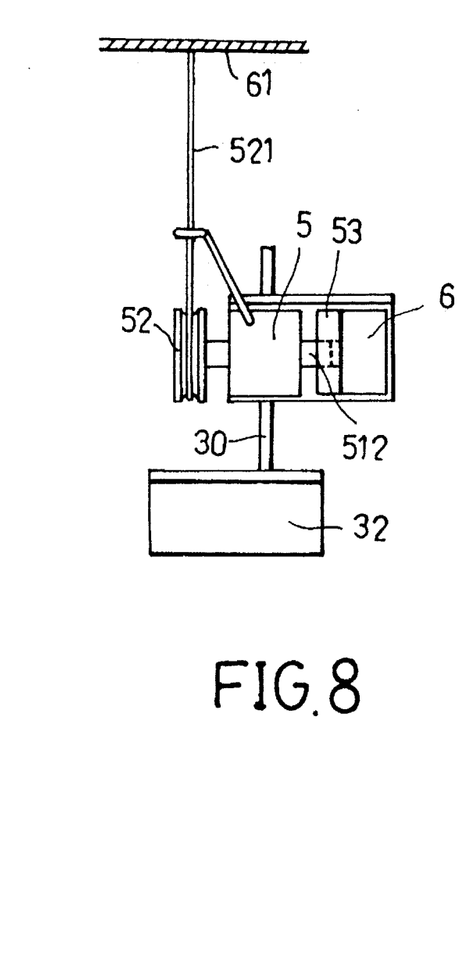
FIG. 8 is a schematic view similar to that of FIG. 7 illustrating the brake pedal unit in a pressed state and the electromagnet in a deactivated state.

The first switching means 96 has a switch housing 960 which has an externally threaded end portion 963 that extends from a front side of the positioning plate 94 to a rear side of the same and that engages a fixed nut 964 which is welded on the rear side of the positioning plate 94. A locking nut 965 engages the end portion 963 of the switch housing 960 on the front side of the positioning plate 94. Thus, the switch housing 960 is rotatable relative to the positioning plate 94 in such a manner that the rotation of the switch housing 960 is converted to longitudinal movement of the switch housing 960 so as to vary the location of an end (G) of the switch housing 960 in order to adjust the angle formed between the pivot shaft 30 and the positioning plate 94 when the pivot shaft 30 is biased to abut normally against the positioning plate 94. A movable pin 961 is constantly biased to extend outwardly from the switch housing 960 through the end (G) of the latter when the pivot shaft 30 is pressed to pivot away from the positioning plate 94 and is forced to extend inwardly into the switch housing 960 when the pivot shaft 30 is released and is biased to abut normally against the positioning plate 94. The normally-closed contacts 962 of the first switching means 96 are open when the movable pin 961 extends inside the switch housing 960.

Referring to FIGS. 1 and 5, a first one of the normally-closed contacts 962 of the first switching means 96 is connected electrically to a first terminal (VS+) of a power source (not shown), such as the battery (not shown) of the automobile, and to a normally-open contact (S11) of a detector (S). The detector (S) is associated operatively with a speedometer (SM) of the automobile and is operable so as to detect the speed of the same. The electrical control means 7 includes a first relay unit (R1), a second relay unit (R2), and a timing unit (T).

The first relay unit (R1) is connected electrically to an overcurrent detecting unit 71 and has a normally-closed contact (R11) connected electrically to the normally-open contact (S11) and to the first terminal (VS+) of the power source via a first one of three normally-open contacts (5A1) of a first coil (5A) of the motor unit 5. The first coil (5A) is connected electrically to the normally-closed contact (R11) via a normally-closed contact (5B2) of a second coil (5B) of the motor unit 5, and to a second terminal (VS−) of the power source.

The electromagnet 6 is connected electrically to the first terminal (VS+) of the power source via a second one of the normally-open contacts (5A1) of the first coil (5A) and to the second terminal (VS−) of the power source. The first terminal of the electromagnet 6 is also connected electrically to the first terminal (VS+) of the power source via one of two normally-open contacts (5B1) of the second coil (5B).

The second relay unit (R2) is connected electrically to the first terminal (VS+) of the power source via a normally-closed contact (T1) of the timing unit (T) and a third one of the normally-open contacts (5A1) of the first coil (5A), and to the second terminal (VS−) of the power source. The second relay unit (R2) is also connected electrically to the first terminal (VS+) of the power source via the normally-closed contact (T1) and a first one of two normally-open contacts (R21) of the second relay unit (R2).

The second coil (5B) is connected electrically to the first terminal (VS+) of the power source via the second normally-closed contact 962 of the first switching means 96 and the second normally-open contact (R21) of the second relay unit (R2), and to the second terminal (VS−) of the power source. The second coil (5B) is also connected electrically to the first terminal (VS+) of the power source via the second normally-closed contact 962 of the first switching means 96 and the second normally-open contact (5B1) of the second coil (5B). The timing unit (T) is connected electrically to the second coil (5B) in parallel.

The overcurrent detecting unit 71 serves as a disabling means and has a coil unit 710 which is disposed at the path of current flow between the normally-open contact (S11) and the normally-closed contact (R11).

Referring to FIG. 1 and to FIGS. 3 to 8, in operation, when the automobile is moving and no pressure is applied on the pedal plate 32, the movable pin 961 of the first switching means 96 is forced by the pivot shaft 30 to extend inside the housing 960 so that the normally-closed contacts 962 of the first switching means 96 are open. The first and second coils (5A,5B) do not conduct, and the normally-open contacts (5A1,5B1) are open so as to deactivate the motor unit 5 and the electromagnet 6. At this stage, the electromagnet 6 attracts normally with the permanent magnet 53 (see FIG. 6) so as to prevent rotation of the driving shaft to prevent correspondingly winding of the string unit 521 on the sheave 52. At the same time, the detector (S) continuously detects whether the speed of the automobile is equal to zero. Once the detector (S) has detected that the speed of the automobile is zero for a predetermined time interval, i.e. two seconds, the normally-open contact (S11) of the detector (S) is closed. At this time, as best shown in FIG. 4, if the pivot shaft 30 is moved away from the positioning plate 94 due to application of pressure on the pedal plate 32, the movable pin 961 of the first switching means 96 extends outside the switch housing 960 and a portion of the string unit 521 between the distal end of the guide member 54 and the body part 61 of the automobile becomes slack (represented by the phantom lines in FIG. 4). Extension of the movable pin 961 of the first switching means 96 outside the switch housing 960 causes the normally-closed contacts 962 of the first switching means 96 to close so as to result in current flow through the first coil (5A). At the same time, the normally-open contacts (5A1) of the first coil (5A) are closed so as to activated the electromagnet 6 in order to repel the permanent magnet 53 and permit rotation of the driving shaft (see FIG. 7). When current flows through the first coil (5A), the motor unit 5 is activated to rotate the driving shaft in a first direction so as to wind the string unit 521 on the sheave 52. The rotation of the driving shaft in the first direction continues until the portion of the string unit 521 between the body part 61 of the automobile and the distal end of the guide member 54 is tensed (represented by the solid lines in FIG. 4) due to the winding of the string unit 521 on the sheave 52. When the portion of the string unit 521 between the body part 61 and the distal end of the guide member 54 is tensed, the resistance to the rotation of the driving shaft becomes stronger so that the current flow between the normally-open contact (S11) and the normally-closed contact (R11) becomes larger. It should be appreciated that a current will be induced on the coil unit 710 of the overcurrent detecting unit 71 when there is a current flow between the normally-open contact (S11) and the normally-closed contact (R11). The detecting unit 71 detects the value of the current flow on the coil unit 710 and compares the value of the current flow to a predetermined value. If the value of the current flow is larger than the predetermined value, the detecting unit 71 activates the first relay unit (R1) so as to open the normally-closed contact (R11) of the first relay unit (R1). Current ceases to flow through the first coil (5A), thereby deactivating the motor unit 5. The normally-open contacts (5A1) are opened to deactivate the electromagnet 6, thereby permitting the permanent magnet 53 to attract with the electromagnet 6 so as to prevent rotation of the driving shaft (see FIG. 8). In this manner, the pivot shaft 30 of the brake pedal unit 3 is prevented from being biased to abut against the positioning plate 94, thus retaining the brake mechanism in a braking state even though the pressure on the pedal plate 32 has been removed. It should be noted that the second relay unit (R2) acts as a memory-type relay unit such that current still flows through the second relay unit (R2) even though the normally-open contacts (5A1) of the first coil (5A) have been opened.

When the gas pedal 81 of the automobile is pressed, the second switching means 82 is activated so that the normally-closed contact 821 is closed. When the normally-open contact 821 is closed, current flows through the second coil (5B), thereby closing the normally-open contacts (5B1). The electromagnet 6 is activated to repel the permanent magnet 53, and the motor unit 5 is activated to rotate the driving shaft in a second direction opposite to the first direction so as to unwind the string unit 521 on the sheave 52. Unwinding of the string unit 521 enables the torsional spring (A) to bias the pivot shaft 30 of the pedal unit 3 to abut against the positioning plate 94 in order to release the automobile from the braking state, thereby permitting the automobile to move again. Current ceases to flow through the second coil (5B) when the pivot shaft 30 abuts against the positioning plate 94 to force the movable pin 961 of the first switching means 96 to extend inside the switch housing 960, thereby deactivating the motor unit 5 to rotate the driving shaft in the second direction. It should be noted that the timing unit (T) is activated for a predetermined short period when the driving shaft rotates in the second direction to open the normally-closed contact (T1) so as to deactivate the second relay unit (R2) in order to open the normally-open contacts (R21). When the normally-open contacts (R21) are opened, the electromagnet 6 and the second coil (5B) remain connected to the first terminal (VS+) of the power source via the first and second normally-open contacts (5B1). The second switching means 82 can also be located at a position where it can be activated by the body of a driver (not shown) before the gas pedal 81 is pressed.

It should be noted that, when the pedal plate 32 is pressed slightly to generate a braking effect while the automobile is moving, the electromagnet 6 and the motor unit 5 remain deactivated if the speed of the automobile is not equal to zero for a two-second time interval. Thus, the brake mechanism of the present invention operates in a manner similar to that of a conventional brake mechanism. That is, since the electromagnet 6 and the motor unit 5 are deactivated, the pivot shaft 30 of the brake pedal unit 3 is biased to abut against the positioning plate 94 immediately after the pedal plate 32 is released. In practice, if the automobile has not stopped within a period of two seconds, the electromagnet 6 and the motor unit 5 are still deactivated even though the first switching means 96 is activated. It should also be noted that the brake mechanism according to the present invention can be retained releasably in different braking states based on the angle formed between the pivot shaft 30 and the positioning plate 94 when the pivot shaft 30 pivots away from the positioning plate 94.

Figure 9:
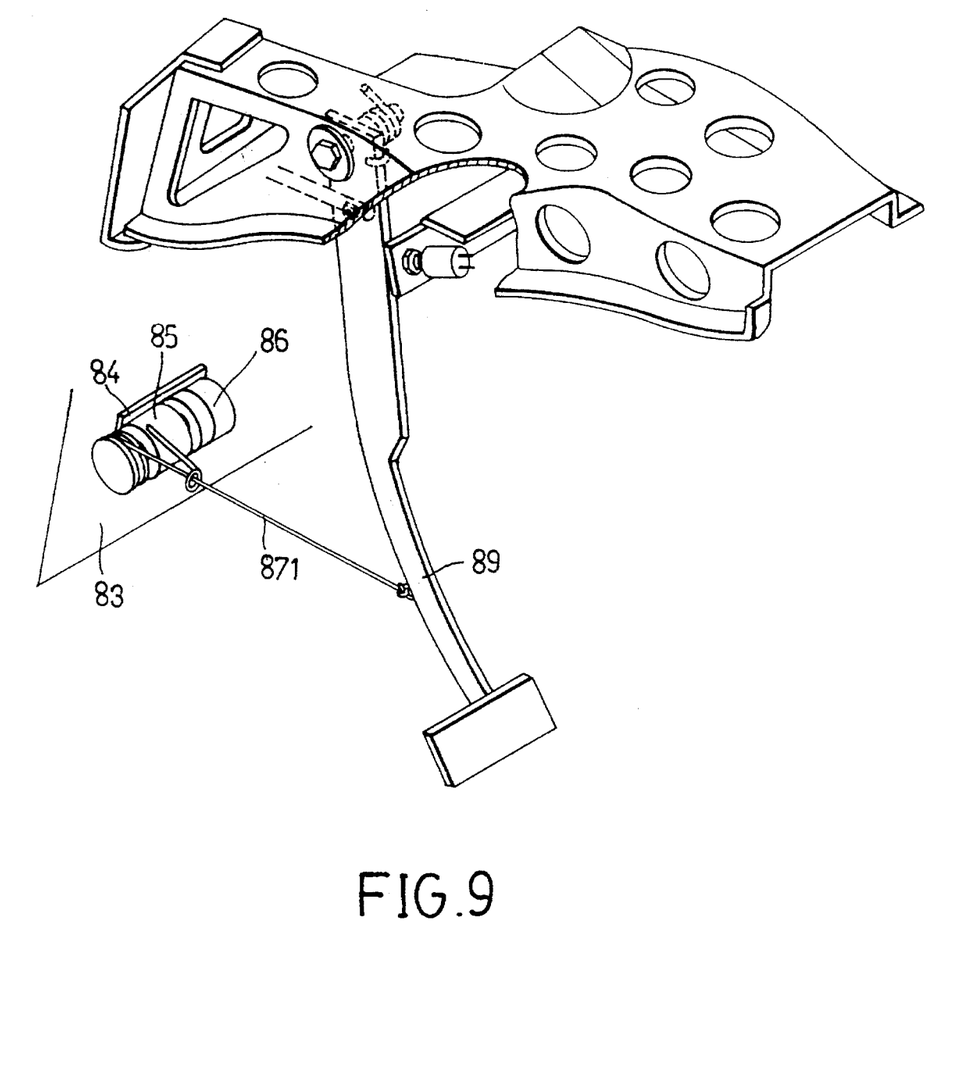
FIG. 9 is a partly enlarged view of the brake mechanism according to a second embodiment of the present invention.

Referring to FIG. 9, a second embodiment of the present invention is shown. Unlike the first embodiment, the seat member 84 on which the electromagnet 86 and the motor unit 85 are respectively mounted and installed, is secured to the body part 83 of the automobile, while the second end portion of the string unit 871 is connected to the pivot shaft 89 of the brake pedal unit. Since the operation of the second embodiment is similar to that of the first embodiment, a detailed description of such will not be provided herein.

While the present invention has been described in connection with what is considered the most practical and preferred embodiments, it is understood that this invention is not limited to the disclosed embodiments, but is intended to cover various arrangements included within the spirit and scope of the broadest interpretation so as to encompass all such modifications and equivalent arrangements.

I claim:

1. A brake mechanism for use in an automobile with a gas pedal and a speedometer, said brake mechanism being retainable releasably in a braking state and comprising:

a fixed base member which is disposed securely in said automobile and which has a front end and a rear end to be disposed adjacent to a body part of said automobile, said base member being formed with a positioning plate between said front and rear ends, and a pivot pin posterior to said positioning plate;

a brake pedal unit having an upper end connected pivotally to said pivot pin;

a torsional spring which is provided on said pivot pin and which biases said brake pedal unit to abut normally against said positioning plate;

a retaining assembly to be provided on one of said body part of said automobile and said brake pedal unit, said retaining assembly including: an electromagnet; a motor unit located on one side of said electromagnet, said motor unit having a driving shaft with a first end portion extending away from said electromagnet and a second end portion extending toward said electromagnet; a sheave mounted securely on said first end portion of said driving shaft; a string unit having a first end portion connected to said sheave and a second end portion to be secured to the other one of said body part of said automobile and said brake pedal unit; and a permanent magnet which is sleeved on said second end portion of said driving shaft between said motor unit and said electromagnet and which is movable along said second end portion;

an electrical control means connected electrically to said electromagnet and said motor unit, said electrical control means normally deactivating said motor unit and said electromagnet to permit said electromagnet to attract normally with said permanent magnet so as to prevent rotation of said driving shaft to prevent correspondingly winding of said string unit on said sheave;

a detector connected electrically to said control means and operatively associated with said speedometer for detecting speed of said automobile;

a first switching means connected electrically to said control means via said detector and operatively associated with said brake pedal unit, said first switching means being activated when said brake pedal unit pivots away from said positioning plate due to application of pressure on said brake pedal unit, said control means being enabled in order to activate said electromagnet so as to repel said permanent magnet and in order to activate said motor unit to rotate said driving shaft in a first direction so as to wind said string unit on said sheave when said first switching means is activated and said detector has detected that said speed of said automobile is zero for a predetermined time interval, thereby placing said brake mechanism in said braking state; and a second switching means connected electrically to said control means and activable so as to release said brake mechanism from said braking state, said second switching means enabling said control means in order to activate said electromagnet so as to repel said permanent magnet and in order to activate said motor unit to rotate said driving shaft in a second direction opposite to said first direction so as to unwind said string unit when said second switching means is activated.

2. A brake mechanism as claimed in claim 1, wherein said second switching means is operatively associated with said gas pedal of said automobile, said second switching means being activated when said gas pedal is pressed.

3. A brake mechanism as claimed in claim 1, further comprising means for disabling said control means in order to deactivate said electromagnet and said motor unit upon detection of a large resistance to rotation of said driving shaft.

* * * * *